US012030292B2

United States Patent
Usui et al.

(10) Patent No.: US 12,030,292 B2
(45) Date of Patent: Jul. 9, 2024

(54) DECORATIVE MATERIAL AND METHOD FOR PRODUCING SAME

(71) Applicant: Dai Nippon Printing Co., Ltd., Tokyo (JP)

(72) Inventors: Hironaga Usui, Wako (JP); Yoshio Sukegawa, Fujimi (JP); Hideo Tanaka, Toshima (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 7 days.

(21) Appl. No.: 17/442,375

(22) PCT Filed: Mar. 27, 2020

(86) PCT No.: PCT/JP2020/013945
§ 371 (c)(1),
(2) Date: Oct. 20, 2021

(87) PCT Pub. No.: WO2020/203737
PCT Pub. Date: Oct. 8, 2020

(65) Prior Publication Data
US 2022/0168992 A1 Jun. 2, 2022

(30) Foreign Application Priority Data
Mar. 29, 2019 (JP) .................................. 2019-067777

(51) Int. Cl.
*B32B 3/30* (2006.01)
*B29C 59/02* (2006.01)
(Continued)

(52) U.S. Cl.
CPC .................. *B32B 3/30* (2013.01); *B32B 7/12* (2013.01); *B32B 27/08* (2013.01); *B32B 27/32* (2013.01);
(Continued)

(58) Field of Classification Search
CPC .. B32B 3/30; B32B 7/12; B32B 27/08; B32B 27/32; B32B 2255/10; B32B 2307/4023;
(Continued)

(56) References Cited

U.S. PATENT DOCUMENTS

2006/0117691 A1* 6/2006 Luetgert ............... E06B 3/7001
52/313
2011/0117325 A1   5/2011 Segaert
2016/0289975 A1* 10/2016 Kobayashi ................ B44C 5/04

FOREIGN PATENT DOCUMENTS

EP   2251193 A1 * 11/2010 ............. B32B 21/02
EP   2251193 A1   11/2010
(Continued)

OTHER PUBLICATIONS

Translation of JPH054310A. (Year: 1993).*
Supplementary European Search Report dated Dec. 6, 2022, issued for European Patent Application No. 20783871.5.

*Primary Examiner* — Catherine A. Simone
(74) *Attorney, Agent, or Firm* — Locke Lord LLP (57) ABSTRACT

A decorative material that can give an excellent three-dimensional effect, and has a good expression of a natural object is provided. The decorative material comprising, on a first principal surface side, a plurality of independent recesses (A), and a groove-shaped parallel recess and projection pattern group (B) that is arranged in at least a part of a spot where the plurality of independent recesses (A) do not exist, wherein when an average depth of the plurality of independent recesses (A) is defined as $X_A$, and an average depth of recesses of the groove-shaped parallel recess and projection pattern group (B) is defined as $X_B$, a relationship of $X_B < X_A$ is satisfied.

10 Claims, 4 Drawing Sheets

(51) Int. Cl.
- *B32B 7/12* (2006.01)
- *B32B 27/08* (2006.01)
- *B32B 27/32* (2006.01)
- *B32B 37/24* (2006.01)
- *B32B 38/06* (2006.01)
- *B44C 1/24* (2006.01)
- *B44C 5/04* (2006.01)
- *B44F 9/02* (2006.01)
- *E04F 13/08* (2006.01)
- *E04F 13/18* (2006.01)

(52) U.S. Cl.
CPC .............. *B32B 37/24* (2013.01); *B32B 38/06* (2013.01); *B44C 1/24* (2013.01); *B44C 5/04* (2013.01); *B44F 9/02* (2013.01); *E04F 13/0871* (2013.01); *E04F 13/18* (2013.01); *B29C 59/022* (2013.01); *B32B 2037/243* (2013.01); *B32B 2255/10* (2013.01); *B32B 2307/4023* (2013.01); *B32B 2307/412* (2013.01); *B32B 2451/00* (2013.01)

(58) Field of Classification Search
CPC .......... B32B 2307/412; B32B 2451/00; B32B 37/24; B32B 38/06; Y10T 428/24438; Y10T 428/24479; Y10T 428/2457; B44F 9/02; E04F 13/18; E04F 13/0871; B44C 1/24; B44C 5/04; B44C 5/043; B29C 59/022

See application file for complete search history.

(56) References Cited

FOREIGN PATENT DOCUMENTS

| | | | |
|---|---|---|---|
| JP | H054310 A | * | 1/1993 |
| JP | H05-131800 A | | 5/1993 |
| JP | H07-314630 A | | 12/1995 |
| JP | H11-268500 A | | 10/1999 |
| JP | 2000-62081 A | | 2/2000 |
| JP | 2018-122575 A | | 8/2018 |

* cited by examiner

DECORATIVE MATERIAL AND METHOD FOR PRODUCING SAME

TECHNICAL FIELD

The present invention relates to a decorative material and a method for producing the same.

BACKGROUND ART

Decorative materials are widely used to decorate interior materials such as furniture and fittings, exterior materials, and the like, and in recent years, in order to enhance a decoration effect, a decorative material that can give a three-dimensional effect has been demanded. As such a decorative material, there has been proposed a decorative material in which regions differing in glossiness are formed within a surface of the decorative material to give a three-dimensional effect by a glossiness contrast.

As means for giving a three-dimensional effect by a glossiness contrast, there are cited means of partially exposing a mat layer, means of partially forming recesses and projections by embossing, means of partially forming a photo luminescent ink layer, a combination of the aforementioned means and the like (Patent Literatures 1 to 3).

CITATION LIST

Patent Literature

PTL1: JP 2000-62081 A
PTL2: JP 7-314630 A
PTL3: JP 2018-122575 A

SUMMARY OF INVENTION

Technical Problem

The decorative material of Patent Literature 1 can give a three-dimensional effect by contrast of a portion (low luster portion) where the mat layer is exposed, and a portion (high luster portion) having a gloss layer, by partially forming the gloss layer on the mat layer formed on an entire surface. However, the decorative material of Patent Literature 1 has disadvantages that the three-dimensional effect is insufficient, and the portion where the mat layer exposed is easily contaminated. Furthermore, since the decorative material of Patent Literature 1 does not have anisotropy of glossiness, an impression of an artificial object is strong, and design aesthetics is insufficient when it is desirable to express a natural object such as wood grain.

In the decorative material of Patent Literature 2, it is possible to give the three-dimensional effect by a contrast of recesses (low luster portions) and a flat portion (high luster portion) by partially forming recesses and projections by embossing. However, the decorative material of Patent Literature 2 has a disadvantage that design aesthetics is insufficient when a natural object is desired to be expressed similarly to the decorative material of Patent Literature 1.

The decorative material of Patent Literature 3 can give the three-dimensional effect by a contrast of the region (low luster portion) having a mat layer and a region (high luster portion) adjacent to the region and having a pearl pigment, to within a surface. However, the decorative material of Patent Literature 3 has also disadvantages that the three-dimensional effect is insufficient, the portion corresponding to the mat layer is easily contaminated, and the design aesthetics is insufficient when a natural object is desired to be expressed, similarly to the decorative material of Patent Literature 1. Furthermore, for the decorative material of Patent Literature 3, it is necessary to use relatively costly materials such as a pearl pigment and metal scales.

The present invention has an object to provide a decorative material that can give an excellent three-dimensional effect, and has a good expression of a natural object and a method for producing the decorative material.

Solution to Problem

In order to solve the above described problem, the present inventors provide [1] to [11] below.

[1] A decorative material comprising, on a first principal surface side of the decorative material, a plurality of independent recesses (A), and a groove-shaped parallel recess and projection pattern group (B) that is arranged in at least a part of a spot where the plurality of independent recesses (A) do not exist, wherein when an average depth of the plurality of independent recesses (A) is defined as $X_A$, and an average depth of recesses of the groove-shaped parallel recess and projection pattern group (B) is defined as $X_B$, a relationship of $X_B < X_A$ is satisfied.

[2] The decorative material as set forth in [1] described above, wherein the $X_A$ is 40 to 150 μm, and the $X_B$ is 5 to 100 μm.

[3] The decorative material as set forth in [1] or [2] described above, wherein the $X_A - X_B$ is 20 μm or more.

[4] The decorative material as set forth in any one of [1] to [3] described above, wherein when an average width of the plurality of independent recesses (A) is defined as $Y_A$, an average width of the recesses of the groove-shaped parallel recess and projection pattern group (B) is defined as $Y_{B1}$, and an average width of projections of the groove-shaped parallel recess and projection pattern group (B) is defined as $Y_{B2}$, $Y_A$ is 150 to 500 μm, the $Y_{B1}$ is 10 to 200 μm, and the $Y_{B2}$ is 10 to 250 μm.

[5] The decorative material as set forth in any one of [1] to [4] described above, wherein when an extending direction of the plurality of independent recesses (A) is defined as $D_A$, and an extending direction of the groove-shaped parallel recess and projection pattern group (B) is defined as $D_B$, $D_A$ and $D_B$ are non-parallel.

[6] The decorative material as set forth in [5] described above, wherein an angle formed by the $D_A$ and $D_B$ is 5 to 70 degrees.

[7] The decorative material as set forth in any one of [1] to [6] described above, wherein a shape in plan view of each of groove-shaped parallel recess and projection patterns constituting the groove-shaped parallel recess and projection pattern group (B) is a wave shape.

[8] The decorative material as set forth in to any one of [1] to [7] described above, wherein when a shape in plan view of the recess (A) is one kind or more selected from the group consisting of a wood vessel, late wood, and a knot.

[9] The decorative material as set forth in any one of [1] to [8] described above, wherein a coloring agent is filled in at least parts in a depth direction of the plurality of independent recesses (A).

[10] The decorative material as set forth in [9] described above satisfying either condition of (i) and (ii) as follows:
(i) The coloring agent is not filled in at least part in a depth direction of recesses of the groove-shaped parallel recess and projection pattern group (B).
(ii) The coloring agent is filled in at least part in the depth direction of the recesses of the groove-shaped parallel recess and projection pattern group (B), and when a filling amount per unit area, of the coloring agent, is defined as $W_B$, and a filling amount per unit area of the coloring agent filled in at least parts in the depth direction of the plurality of independent recesses (A) is defined as $W_A$, a relation of $W_B < W_A$ is satisfied.

[11] A method for producing a decorative material comprising steps (1) and (2) as follows:
(1) A step of performing shaping onto a single layer of a base material selected from a plastic film or a complex of a plastic film and paper, or a laminate including the base material, with an embossing plate, to obtain the decorative material as set forth in to any one of [1] to [8] described above.
(2) A step of coating a surface on the first principal surface side of the decorative material obtained in the (1) with a filling ink comprising a coloring agent and a binder resin, and thereafter scraping out the filling ink.

Advantageous Effects of Invention

The decorative material of the present invention can give an excellent three-dimensional effect, has good expressivity of a natural object, and therefore can make the design aesthetics extremely good. Furthermore, the method for producing the decorative material of the present invention can easily produce the decorative material including the aforementioned effects.

DESCRIPTION OF EMBODIMENT

Figure 1:
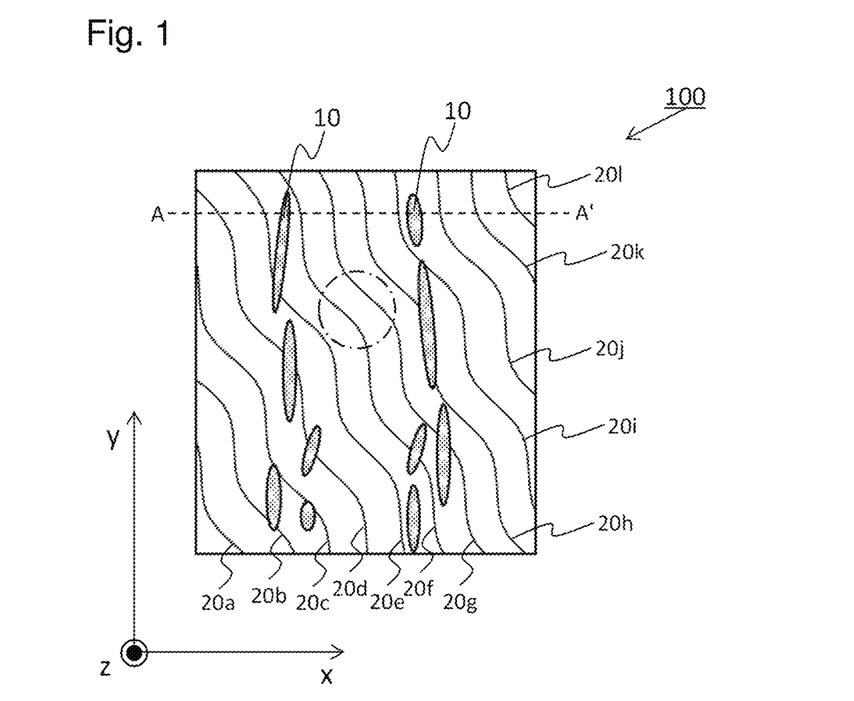
FIG. 1 is a plan view of a first principle surface side showing one embodiment of a decorative material of the present invention.

[Decorative Material]
A decorative material of the present invention has a plurality of independent recesses (A), and a groove-shaped parallel recess and projection pattern group (B) that is disposed in at least a part of a spot where the plurality of recesses (A) do not exist, on a first principal surface side, and when an average depth of the plurality of independent recesses (A) is defined as $X_A$, and an average depth of recesses of the groove-shaped parallel recess and projection pattern group (B) is defined as $X_B$, a relationship of $X_B < X_A$ is satisfied.
<First Principal Surface of Decorative Material>
FIG. 1 is a plan view of a first principal surface side showing one embodiment of a decorative material 100 of the present invention. As shown in FIG. 1, the decorative material 100 of the present invention has a plurality of independent recesses (A) 10, and a groove-shaped parallel recess and projection pattern group (B) 20 that is arranged in a spot where the plurality of recesses (A) 10 do not exist, on a surface on the first principal surface side. Note that in FIG. 1, the groove-shaped parallel recess and projection pattern (B) 20 is constituted of groove-shaped recess and projection patterns 20a, 20b, . . . , and 20l, and the respective groove-shaped recess and projection patterns are parallel.

Figure 2:
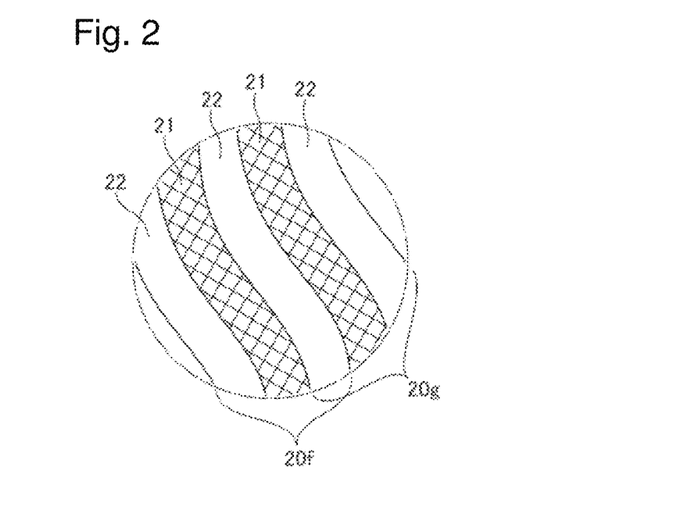
FIG. 2 is an enlarged plan view of a circular part surrounded by an alternate long and short dash line in FIG. 1.

FIG. 2 is an enlarged plan view of a circular part surrounded by an alternate long and short dash line in FIG. 1. As shown in FIG. 2, the groove-shaped parallel recess and projection pattern group (B) 20 is constituted of recesses 21 and projections 22 surrounded by the recesses 21.

Note that in the present description, "parallel" of the groove-shaped parallel recess and projection pattern group means that adjacent recesses are parallel, when the decorative material is seen in plan view. Furthermore, "parallel" of the groove-shaped parallel recess and projection pattern group is not limited to completely parallel, but includes substantially parallel. Substantially parallel means that when tangential lines are drawn to edges of a pair of adjacent recesses, an angle formed by two tangential lines is within 7.0 degrees, and the angle is preferably within 5.0 degrees, and more preferably within 3.0 degrees.

Figure 3:
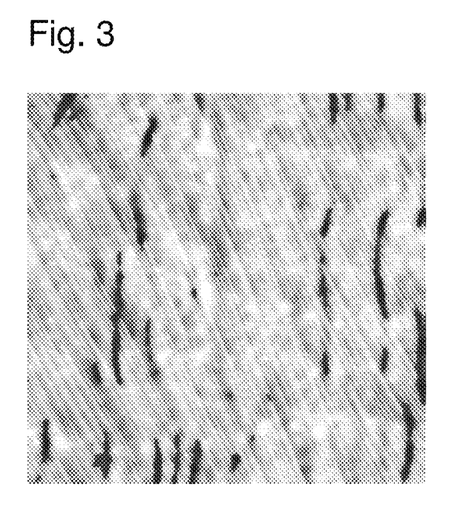
FIG. 3 is an image obtained by measuring an altitude of a decorative material in example 1 from a first principal surface side and expressing the measured altitude by density.

FIG. 3 is a plan view obtained by measuring an altitude of a decorative material in example 1 from a first principal surface side, and expressing the measured altitude by density. FIG. 3 means that the lower the density, the higher the altitude, and the higher the density, the lower the altitude. In FIG. 3, an elongated portion with high density extending in an up-down direction corresponds to the recess (A). In a surface of the decorative material in FIG. 3, a plurality of recesses (A) independently exist. Furthermore, in FIG. 3, a portion with low density extending diagonally downward to the right corresponds to the groove-shaped parallel recess and projection pattern group (B). The groove-shaped parallel recess and projection pattern group (B) is arranged in a spot where the plurality of independent recesses (A) do not exist.

Figure 4:
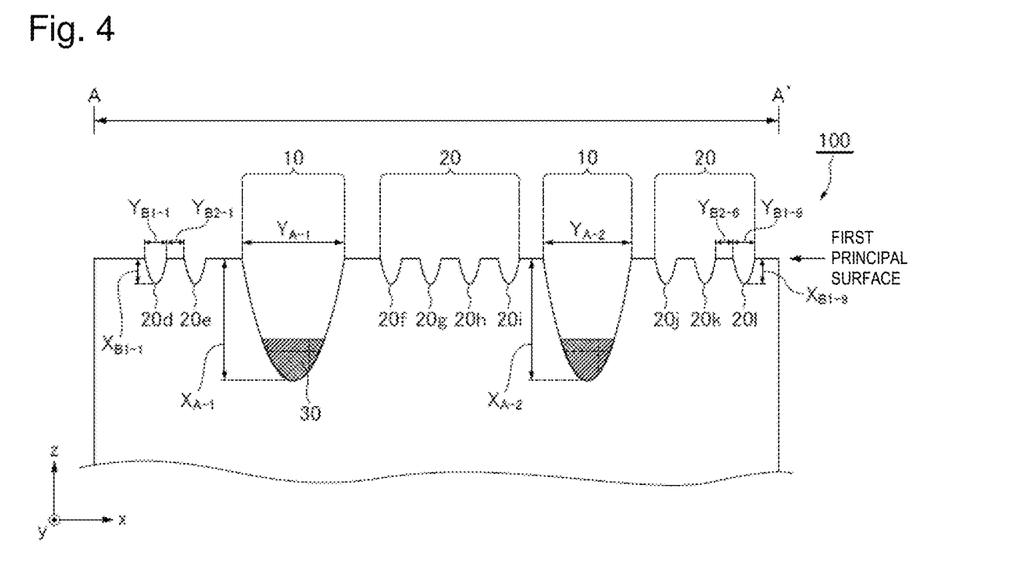
FIG. 4 is a sectional view comprising a cut plane including line A-A' in FIG. 1 and parallel to a z-axis in FIG. 1.

FIG. 4 is a sectional view comprising a cut surface including line A-A' in FIG. 1 and parallel with a z-axis in FIG. 1.

In the first principal surface of the decorative material, spots having the recesses (A) have the deep average depth $X_A$, so that light that is incident on the spots is easily scattered and attenuated due to multiple reflection. Accordingly, the spots having the recesses (A) are visually recognized as dark. On the other hand, spots having the groove-shaped parallel recess and projection pattern groups (B) are visually recognized as brighter than the recesses (A) because multiple reflection does not occur in the projections, and the average depth $X_B$ is shallow in the recesses so that there are few multiple reflections. Furthermore, brightness of the spots having the groove-shaped parallel recess and projection pattern groups (B) differ in brightness between a case being visually recognized from the extending direction of the groove, and a case of being visually recognized from a direction orthogonal to the extending direction of the groove. A reason thereof is that there are fewer multiple reflections of the light incident on the recesses in the case of being visually recognized from the extending direction of the groove.

As above, the decorative material of the present invention has the plurality of independent recesses (A) and the groove-shaped parallel recess and projection pattern groups (B), and satisfies the relationship of $X_B < X_A$, so that the spots having the groove-shaped parallel recess and projection pattern groups (B) can be visually recognized relatively brightly as compared with the spots having the recesses (A), and a three-dimensional effect can be given by brightness contrast. Furthermore, anisotropy can be given to the brightness by the groove-shaped parallel recess and projection pattern groups (B), so that a natural object can be excellently expressed.

A ratio of an area occupied by the recesses (A) (a total area of the plurality of independent recesses (A)) to a total area of the first principal surface is preferably 20 to 50%, and is more preferably 30 to 40%.

<<Depth>>

An average depth $X_A$ of the plurality of independent recesses (A) can be calculated in steps of A1 to A3 below.

Figure 5:
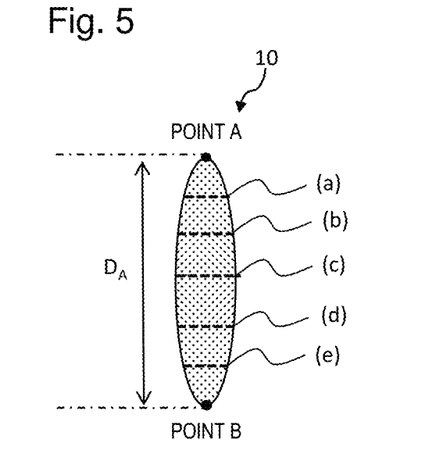
FIG. 5 is a plan view explaining one step of calculating an average depth ($X_A$) of a plurality of independent recesses (A).

A1: Concerning the respective recesses (A), height data in the direction across each of the respective recesses (A) is measured at five randomly extracted spots to obtain five cross-sectional curves with height data. When a shape in plan view of the recess (A) is an elongated shape extending in an arbitrary direction, the height data is measured in a direction orthogonal to the extending direction of the recess (A). For example, when the shape in plan view is that of the recess (A) in FIG. 5, height data in dotted line directions that are directions orthogonal to the extending direction (up-down direction in FIG. 5) of the recess (A) are measured in 5 spots of "a" to "e".

A2: From the height data measured in A1, maximum depths at the respective measurement spots are extracted, and an average value of the maximum depths at 5 spots is determined as the average depth of each of the respective recesses (A).

A3: $X_A$ is calculated by averaging the average depths of the respective recesses (A) calculated in A2.

For example, when an average depth (an average of the maximum depths at five spots) of the recess (A) at a left side is set as $X_{A-1}$, and an average depth (an average of the maximum depths at five spots) of the recess (A) at a right side is set as $X_{A-2}$ in FIG. 4, the average depth $X_A$ of the plurality of independent recesses (A) can be calculated by an expression below.

Average depth $X_A$ of the recess $(A) = (X_{A-1} + X_{A-2})/2$

An average depth $X_B$ of the recesses of the groove-shaped parallel recess and projection pattern group (B) can be calculated by B1 to B3 below.

B1: Concerning each of the recesses of the groove-shaped parallel recess and projection pattern group (B) existing in the surface of the decorative sheet, height data in a direction to cross each of the recesses is measured at five spots extracted at random, and five cross-sectional curves including the height data are obtained. A measurement direction in each of the measurement spots is a direction orthogonal to the extending direction of the recess. Note that in order to measure widths of projections of the groove-shaped parallel recess and projection pattern group (B) simultaneously, the cross-sectional curves preferably cross the projections.

B2: From the height data measured in B1, maximum depths at the respective measurement spots are extracted, and an average value of the maximum depths at the five spots is determined as the average depth of each of the recesses.

B3: $X_B$ is calculated by averaging the average depths of the respective recesses calculated in B2.

For example, in FIG. 4, let $X_{B1-n}$ an average depth (an average of maximum depths at five spots) of a recess located $n^{th}$ from the left. In FIG. 4, nine recesses of the groove-shaped parallel recess and projection pattern group (B) exit (20d to 20l in FIG. 4), and therefore, the average depth $X_B$ of the recesses of the groove-shaped parallel recess and projection pattern group (B) can be calculated by an expression below.

Average depth $X_B$ of the recesses of the groove-shaped parallel recess and projection pattern group $(B) = (X_{B1-1} + X_{B1-2} + X_{B1-3} + X_{B1-4} + X_{B1-5} + X_{B1-6} + X_{B1-7} + X_{B1-8} + X_{B1-9})/9$ The average depth $(X_A)$ of the plurality of independent recesses (A) is preferably 40 to 150 μm, more preferably 45 to 120 μm, and even more preferably 50 to 100 μm. By making $X_A$ 40 μm or more, it is possible to easily decrease brightness of the spot having the recess (A). Furthermore, by making $X_A$ 150 μm or less, it is possible to reproduce a realistic design in which darkness of the recesses (A) and shine of the groove-shaped parallel recess and projection pattern group (B) are well harmonized.

The average depth $(X_B)$ of the recesses of the groove-shaped parallel recess and projection pattern group (B) is preferably 5 to 100 μm, more preferably 10 to 70 μm, and even more preferably 15 to 60 μm. By making $X_B$ 5 μm or more, it is possible to easily give anisotropy of brightness. Furthermore, by making $X_B$ 100 μm or less, it is possible to enhance a brightness contrast of the plurality of independent recesses (A) and the groove-shaped parallel recess and projection pattern group (B). Note that when a wiping step described later is performed, $X_B$ is preferably made 60 μm or less from a viewpoint of making it difficult to fill the recesses of the groove-shaped parallel recess and projection pattern (B) with a coloring agent.

Furthermore, $X_A - X_B$ is preferably 20 μm or more, more preferably 30 μm or more, and even more preferably 40 μm or more. By making $X_A - X_B$ 20 μm or more, it is possible to easily enhance the brightness contrast of the plurality of independent recesses (A) and the groove-shaped parallel recess and projection pattern group (B). Furthermore, by making $X_A - X_B$ 20 μm or more, the recesses (A) are filled with a large amount of coloring agent while an amount of coloring agent filled in the recesses of the groove-shaped parallel recess and projection pattern (B) is reduced when the wiping step described later is performed, so that it is possible to make the contrast better.

<<Width and Length>>

Furthermore, in the decorative material of the present invention, $Y_A$, $Y_{B1}$ and $Y_{B2}$ are preferably in the following range when an average width of the recesses (A) is defined as $Y_A$, an average width of the recesses of the groove-shaped parallel recess and projection pattern group (B) is defined as $Y_{B1}$, and an average width of the projections of the groove-shaped parallel recess and projection pattern group (B) is defined as $Y_{B2}$. Note that each of the projections of the groove-shaped parallel recess and projection pattern group (B) means the projection located between the recesses of the groove-shaped parallel recess and projection pattern group (B).

$Y_A$ is preferably 150 to 500 μm, more preferably 170 to 450 μm, and even more preferably 200 to 400 μm.

By making $Y_A$ 150 μm or more, it is possible to cause each of the recesses (A) to be easily recognized as an independent region. Note that by making $Y_A$ 150 μm or more, it is possible to make it easy to fill the recesses (A) with a large amount of coloring agent when performing the wiping step described later. Furthermore, by making $Y_A$ 500 μm or less, light incident on the inside of the recess (A) is easily reflected multiple times, and the recess (A) can be easily recognized as dark visually.

$Y_{B1}$ is preferably 10 to 200 µm, more preferably 15 to 150 µm, and even more preferably 20 to 100 µm. By making $Y_{B1}$ 10 µm or more, it is possible to easily cause a person to visually recognize reflected light from the recesses of the groove-shaped parallel recess and projection pattern group (B), and by extension, it is possible to easily give anisotropy of brightness. Further, by making $Y_{B1}$ 200 µm or less, it is possible to easily increase a brightness difference between a case of being visually recognized from the extending direction of the groove, and a case of being visually recognized from a direction orthogonal to the extending direction of the groove, and it is possible to easily give the anisotropy of the brightness. Note that by making $Y_{B1}$ 200 µm or less, it is possible to make it difficult to fill the recesses of the groove-shaped parallel recess and projection pattern group (B) with a coloring agent when performing the wiping step described later.

$Y_{B2}$ is preferably 10 to 250 µm, more preferably 20 to 200 µm, and even more preferably 40 to 180 µm. By making $Y_{B2}$ 10 µm or more, it is possible to easily increase brightness of the spot having the groove-shaped parallel recess and projection pattern group (B). Furthermore, by making $Y_{B2}$ 200 µm or less, it is possible to suppress reflection of the projections of the groove-shaped parallel recess and projection pattern group (B) from being too strong, and cause the anisotropy of the brightness based on the recesses of the groove-shaped parallel recess and projection pattern group to be easily recognized.

In order to easily make the three-dimensional effect and expression of a natural object good, $Y_A$, $Y_{B1}$ and $Y_{B2}$ preferably satisfy either one of expressions (1) and (2) below, and more preferably satisfy expressions (1) and (2) below. Furthermore, when $Y_A$, $Y_{B1}$ and $Y_{B2}$ satisfy either one of expressions (1) and (2) below, $Y_A$, $Y_{B1}$ and $Y_{B2}$ preferably further satisfy either one of expressions (3) and (4) below. Furthermore, when $Y_A$, $Y_{B1}$ and $Y_{B2}$ satisfy expressions (1) and (2) below, $Y_A$, $Y_{B1}$ and $Y_{B2}$ more preferably further satisfy expressions (3) and (4) below. $Y_{B1}/Y_A$ in expression (3) is more preferably 0.20 or more and 0.40 or less. $Y_{B2}/Y_A$ in expression (4) is more preferably 0.20 or more and 0.60 or less.

$$Y_{B1} < Y_A \tag{1}$$

$$Y_{B2} < Y_A \tag{2}$$

$$0.06 \leq Y_{B1}/Y_A \leq 0.40 \tag{3}$$

$$0.10 \leq Y_{B2}/Y_A \leq 1.00 \tag{4}$$

The average width $Y_A$ of the plurality of independent recesses (A) can be calculated by C1 and C2 below.

C1: From five cross-sectional curves measured in A1 described above, a width of the recess (A) at each of the measurement spots is calculated, and an average value of the widths at five spots is determined as an average value of each of the recesses (A).

C2: $Y_A$ is calculated by averaging widths of the respective recesses (A) calculated in C1 described above.

For example, when an average width (an average of widths at five spots) of the recess (A) at the left side is set as $Y_{A-1}$, and an average width (an average of widths at five spots) of the recess (A) at the right side is set as $Y_{A-2}$ in FIG. 4, the average width $Y_A$ of the plurality of independent recesses (A) can be calculated by an expression below.

Average width $Y_A$ of the recesses $(A) = (Y_{A-1} + Y_{A-2})/2$

The average width $Y_{B1}$ of the recesses of the groove-shaped parallel recess and projection pattern group (B) can be calculated by D1 and D2 below.

D1: From the five cross-sectional curves measured in B1 described above, the width of the recess at each of the measurement spots is calculated, and an average value of the widths at the five spots is determined as an average value of each of the recesses.

D2: $Y_{B1}$ is calculated by averaging the average widths of the respective recesses calculated in D1 described above.

For example, in FIG. 4, an average width (an average of widths at five spots) of the recess located $n^{th}$ from the left is set as $Y_{B1-n}$. Since nine recesses of the groove-shaped parallel recess and projection pattern group (B) exist in FIGS. 4 (20d to 20l in FIG. 4), the average width $Y_{B1}$ of the recesses of the groove-shaped parallel recess and projection pattern group (B) can be calculated by an expression below.

Average width $Y_{B1}$ of the recesses of the groove-shaped parallel recess and projection pattern group $(B) = (Y_{B1-1} + Y_{B1-2} + Y_{B1-3} + Y_{B1-4} + Y_{B1-5} + Y_{B1-6} + Y_{B1-7} + Y_{B1-8} + Y_{B1-9})/9$ The average width $Y_{B2}$ of the projections of the groove-shaped parallel recess and projection pattern group (B) can be calculated by E1 to E2 below. Note that each of the projections of the groove-shaped parallel recess and projection pattern group (B) means the projection located between the recesses of the groove-shaped parallel recess and projection pattern group (B).

E1: From the five cross-sectional curves measured in B1 described above, the width of the projection at each of the measurement spots is calculated, and an average value of the widths at the five spots is determined as the average width of each of the projections.

E2: $Y_{B2}$ is calculated by averaging the average widths of the respective projections calculated in E1 described above.

For example, in FIG. 4, an average width (average of widths at five spots) of the projection located nth from the left is set as $Y_{B2-n}$. Since six projections of the groove-shaped parallel recess and projection pattern group (B) exist in FIG. 4, the average width $Y_{B2}$ of the projections of the groove-shaped parallel recess and projection pattern group (B) can be calculated by an expression below.

Average width $Y_{B2}$ of projections of the groove-shaped parallel recess and projection pattern group $(B) = (Y_{B2-1} + Y_{B2-2} + Y_{B2-3} + Y_{B2-4} + Y_{B2-5} + Y_{B2-6})/6$ Lengths of the plurality of independent recesses (A) are not particularly limited, and a preferable length range cannot be said unconditionally because the preferable length range varies depending on the design to be expressed. For example, when the design expressed by the entire decorative sheet is a pattern of wood, an average length ($L_A$) of the recesses (A) is preferably 2 to 50 mm, and more preferably 5 to 30 mm.

The average length of the recesses (A) can be calculated as an average value of lengths of respective recessed (A) that are measured. Note that the length of each of the recesses (A) means a maximum value of distances between arbitrary two points in each of the recesses (A).

A length of each of the groove-shaped recess and projection patterns constituting the groove-shaped parallel recess and projection pattern group (B) is not particularly limited, but is preferably substantially a length across the decorative sheet from any end portion of the decorative sheet to another end portion (However, spots where the recesses (A) exist are excluded. Furthermore, vicinities of the recesses (A) are also excluded as necessary.) as shown in FIG. 1.

<<Specific Example of Shape in Plan View>>

A shape in plan view of the recess (A) is not particularly limited, and various patterns can be cited.

When the design to be expressed by the entire decorative sheet is a pattern of wood, the shape in plan view of the recess (A) preferably forms one or more kinds of patterns selected from the group consisting of a vessel, a late wood and a knot.

A vessel is a cylindrical cell that serves as a passage for water, and arrangement of minute vessels makes it appear to human eyes that a dark pattern is formed along the arrangement. A late wood refers to a dark-colored part with narrow grain widths that is formed from summer to autumn. Note that a part with large grain widths that is formed from spring to summer is referred to as a early wood, and annual rings of the wood are formed by early wood and late wood being alternately repeated. A knot is a trace of a branch that is taken into a trunk, has a shape close to a circle or an ellipse, and has a darker color than surrounding tissue.

Furthermore, when the design expressed by the entire decorative sheet is a stone pattern such as travertine, the shape in plan view of the recess (A) is preferably a depressed portion. Furthermore, when the design expressed by the entire decorative sheet is a tile pattern or a brick pattern, the shape in plan view of the recess (A) is preferably a joint pattern. Furthermore, when the design expressed by the entire decorative sheet is a fabric pattern, the shape in plan view of the recess (A) is preferably a recess of a fabric. Furthermore, when the design expressed by the entire decorative sheet is a leather pattern, the shape in plan view of the recess (A) is preferably a wrinkled pattern.

The shape in plan view of each of the groove-shaped recess and projection patterns constituting the groove-shaped parallel recess and projection pattern group (B) is not particularly limited, and various patterns are cited, but the shape in plan view of each of the groove-shaped recess and projection patterns is preferably a wavy shape as shown in FIG. 1.

By making the shape in plan view of the groove-shaped recess and projection pattern a wavy shape, brightness of the spot having the groove-shaped parallel recess and projection pattern group (B) changes along a shape of a wave. Accordingly, a light-dark contrast of the recesses (A) and the groove-shaped parallel recess and projection pattern group (B) is not uniform, and expressivity of a natural object can be made good. Furthermore, a distribution of the aforementioned light-dark contrast changes when an incident direction of light changes, or an observer moves, so that the design aesthetics can be made extremely good.

A wavelength (period) and a wave height of the wavy pattern is not particularly limited, and the wavelength (period) can be properly adjusted in a range of around 1 to 100 mm, and the wave height can be properly adjusted in a range of around 1 to 20 mm.

<<Extending Direction>>

When in the decorative material of the present invention, the extending direction of the plurality of independent recesses (A) is defined as $D_A$, and the extending direction of the groove-shaped parallel recess and projection pattern group (B) is defined as $D_B$, $D_A$ and $D_B$ are preferably non-parallel. By making $D_A$ and $D_B$ non-parallel, and by performing ink scraping in the wiping step described later in a direction parallel with $D_A$, the recesses (A) are filled with a large amount of coloring agent while an amount of the coloring agent that is filled in the recesses of the groove-shaped parallel recess and projection pattern (B) is reduced, so that the contrast can be made better.

The extending direction ($D_A$) of the plurality of independent recesses (A) means an average direction of the extending directions of the respective recesses (A). Furthermore, the extending direction of each of the recesses (A) means a direction in which a distance between arbitrary two points in each of the recesses (A) becomes maximum. For example, in a case of the recess (A) in FIG. 5, a direction of connecting two points that are a point A and a point B is the extending direction $D_A$.

The extending direction ($D_B$) of the groove-shaped parallel recess and projection pattern group (B) means a direction obtained by averaging the extending directions of the respective recesses. Further, the extending direction of each of the recesses means a direction of a straight line connecting a start point and an end point of each of the recesses.

An angle formed by $D_A$ and $D_B$ is preferably 5 to 70 degrees, more preferably 7 to 50 degrees, and even more preferably 10 to 40 degrees.

By making the angle 5 degrees or more, ink scraping in the wiping step described later is performed in a direction parallel with $D_A$, whereby a large amount of coloring agent is filled in the recesses (A) while an amount of the coloring agent filled in the recesses of the groove-shaped parallel recess and projection pattern (B) is reduced, and the contrast can be made better. Furthermore, by making the angle 70 degrees or less, it is possible to easily prevent a scraping blade from being caught by the groove-shaped parallel recess and projection pattern group (B) when wiping in the direction parallel with $D_A$.

<<Coloring Agent>>

In the decorative material of the present invention, a coloring agent 30 is preferably filled in at least parts in the depth direction of the plurality of independent recesses (A) as shown in FIG. 4. By adopting the structure, the design aesthetics of the decorative material can be made better. Furthermore, by using a coloring agent of a dark color as the coloring agent, it is possible to make the recesses (A) darker, and it is possible to enhance the brightness contrast in the decorative material surface more. The dark color refers to colors with low brightness and low coloration that feel dark, such as dark gray, dark green, navy blue, black, dark purple, dark red, and brown.

As means for filling the coloring agent in at least parts in the depth direction of the recesses (A), there is cited means of coating the first principal surface side of the decorative material with a filling ink including a coloring agent and a binder resin, and scraping out the ink with a scraping blade such as a doctor blade. At this time, it is possible to adjust the amount of the coloring agent that is filled in the recess (A) by adjusting a material of the blade, an angle to hit the blade, viscosity of the ink and the like.

As the coloring agent, there is cited an inorganic pigment such as carbon black (Japanese ink), iron black, titanium white, antimony white, chrome yellow, titanium yellow, red iron oxide, cadmium red, ultramarine, or cobalt blue, an organic pigment such as quinacridone red, isoindolenon-yellow, or phthalocyanine blue, dye or the like, for example.

As the binder resin of the filling ink, there are cited acrylic resin, styrene resin, polyester resin, urethan resin, chlorinated polyolefin resin, vinyl chloride-vinyl acetate copolymer, polyvinyl butyral, alkyd resin, petroleum resin, ketone resin, epoxy resin, melamine resin, fluororesin, silicone resin, rubber resin and the like.

The decorative material of the present invention preferably further satisfies either condition of (i) and (ii) below, in the structure in which the coloring agent is filled in at least parts in the depth direction of the plurality of independent recesses (A).

(i) The coloring agent is not filled in at least part in the depth direction of the recesses of the groove-shaped parallel recess and projection pattern group (B).

(ii) The coloring agent is filled in at least part in the depth direction of the recesses of the groove-shaped parallel recess and projection pattern group (B), and when a filling amount per unit area of the coloring agent is defined as $W_B$, and a filling amount per unit area of the coloring agent filled in at least parts of the depth direction of the plurality of independent recesses (A) is defined as $W_A$, a relationship of $W_B < W_A$ is satisfied.

By satisfying either condition of (i) and (ii) described above, a contrast based on a difference in amount of the coloring agent occurs between the recesses (A) and the recesses constituting the groove-shaped parallel recess and projection pattern group (B), and the design aesthetics can be made better. Furthermore, by using the coloring agent of a dark color as the coloring agent, a brightness contrast between the recesses (A) and the recesses constituting the groove-shaped parallel recess and projection pattern group (B) becomes higher, and it is possible to make the three-dimensional effect stand out more.

Note that in the present description, $W_A$ means an average of the filling amounts of the coloring agent per unit area of the respective recesses (A), and $W_B$ means an average of the filling amounts of the coloring agent per unit area of the respective recesses constituting the groove-shaped parallel recess and projection pattern group (B).

In order to easily satisfy either condition of (i) and (ii) described above, at least one or more embodiments selective from the ranges of $X_A$, the ranges of $X_B$, the ranges of $X_A-X_B$, the ranges of $Y_A$, the ranges of $Y_{B1}$, the ranges of $Y_{B2}$, and $D_A$ relationship with $D_B$ are preferably made the aforementioned preferable embodiment.

<Second Principal Surface>

A shape of a surface (second principal surface) at an opposite side to the first principal surface of the decorative material is not particularly limited, and may be smooth, or may be given recesses and projections.

<Laminated Structure of Decorative Material>

For the decorative material of the present invention, laminated structures of (1) to (8) described below are cited. Note that "I" shows an interface of layers, and a surface of a layer located at a left side shows the first principal surface of the decorative material.

(1) Single layer of base material
(2) Decorative layer/base material
(3) Surface protective layer/decorative layer/base material
(4) Transparent resin layer/decorative layer/base material
(5) Surface protective layer/transparent resin layer/decorative layer/base material
(6) Surface protective layer/primer layer/transparent resin layer/decorative layer/base material
(7) Surface protective layer/base material/decorative layer
(8) Surface protective layer/primer layer/base material/decorative layer <<Base Material>>

The decorative material preferably includes a base material. A material of the base material is not particularly limited, but considering the ease of forming the plurality of independent recesses (A) and the groove-shaped parallel recess and projection pattern group (B) by embossing, a plastic film or a complex of a plastic film and paper is preferable.

As a specific example of a resin constituting the plastic film, a polyolefin resin such as polyethylene and polypropylene, a vinyl resin such as vinyl chloride resin, vinylidene chloride resin, polyvinyl alcohol, and ethylene-vinyl alcohol copolymer, polyester resin such as polyethylene terephthalate, and polybutylene terephthalate, acrylic resin such as polymethyl methacrylate, polymethyl acrylate, and polyethyl methacrylate, polystyrene, acrylonitrile-butadiene-styrene copolymer (ABS resin), cellulose triacetate, polycarbonate and the like are cited. Among these, a polyolefin resin, vinyl chloride resin, polyester resin or acrylic resin is preferable, from viewpoints of various physical properties such as weather resistance and water resistance, printability, forming process suitability, price and the like.

The base material may be a transparent base material, or may be a colored base material. Furthermore, the base material may be a laminated base material with a plurality of base materials laminated. Note that when the laminated structure of the decorative material is (7) and (8) described above, a transparent base material is used for the base material to visually recognize the decorative layer through the base material.

A thickness of the base material is not particularly limited, but is preferably 20 to 200 μm, more preferably 40 to 160 μm, and even more preferably 40 to 100 μm.

On the base material, in order to improve adhesion with a layer provided on the base material, easy adhesion treatment such as physical treatment or chemical surface treatment may be performed on one side or both sides.

<<Decorative Layer>>

From a viewpoint of improving design aesthetics, the decorative sheet preferably has a decorative layer on an arbitrary spot of the decorative sheet.

The spot where the decorative layer is formed is preferably a side close to the base material from a viewpoint of enhancing the weather resistance of the decorative layer. Note that when the base material is transparent, the decorative layer may be located on an inner layer side (opposite side to the first principal surface) from the base material, as the above described laminate structures (7) and (8).

The decorative layer may be, for example, a colored layer (a so-called solid colored layer) covering an entire surface, or a pattern layer formed by printing various patterns by using an ink and a printer, or a combination of these.

A pattern given by the decorative layer is not particularly limited, and there are cited a wood pattern, a stone pattern, a tile pattern, a brick pattern, a fabric pattern and a leather pattern, for example. It is possible to emphasize the effect based on the aforementioned shape of the first principal surface more by forming these patterns by the decorative layer.

The wood pattern is preferably formed by combining one or more kinds of patterns selected from the group consisting of a wood surface portion, a vessel, late wood and a knot.

The stone pattern is preferably formed by combining a stone texture portion, and depressed portions.

The tile pattern or the brick pattern is preferably formed by combining a texture portion of a tile or a brick, and a joint pattern.

The fabric pattern is preferably formed by combining a fabric texture portion and recesses of the fabric.

The leather pattern is preferably formed by combining a leather texture portion and a wrinkled pattern.

For example, the decorative layer can be formed by applying a decorative layer ink including a coloring agent such as a pigment and a dye, and a binder resin, and drying the applied ink. Additive such as an extender pigment, an anti-oxidant, a plasticizer, a catalyst, a curing agent, an ultraviolet absorber, and a light stabilizer can be mixed with the ink as necessary.

The coloring agent and the binder resin of the decorative layer are not particularly limited, and same things as those illustrated in the filling ink can be used, for example.

A thickness of the decorative layer can be properly selected according to a desired pattern, but from viewpoints of concealing a ground color of an adherend, and improving the design aesthetics, the thickness of the decorative layer is preferably 0.1 μm or more and 20 μm or less, more preferably 0.5 μm or more and 10 μm or less, and even more preferably 1.0 μm or more and 5.0 μm or less.

<<Surface Protective Layer>>

The decorative material may have a surface protective layer to enhance scratch resistance.

The surface protective layer preferably includes a cured product of a curable resin composition, from a viewpoint of improving scratch resistance of the decorative sheet.

As the curable resin composition, there are cited thermosetting resin compositions including a thermosetting resin, ionizing radiation curable resin compositions including an ionizing radiation curable resin, and a mixture thereof. Among them, ionizing radiation curable resin compositions are preferable, from a viewpoint of enhancing crosslink density of the surface protective layer and improving surface characteristics such as scratch resistance. Furthermore, an electron ray curable resin composition is more preferable among the ionizing radiation curable resin compositions from a viewpoint of being able to be coated with no solvent, and easy to handle.

The thermosetting resin composition is a composition including at least a thermosetting resin, and is a resin composition that cures by heating. As the thermosetting resin, there are cited acrylic resin, urethan resin, phenol resin, urea melamine resin, epoxy resin, unsaturated polyester resin, silicon resin and the like. For the thermosetting resin compositions, a curing agent is added to these curable resins as necessary.

An ionizing radiation curable resin composition is a composition including a compound having an ionizing radiation curable functional group (hereinafter, also referred to as an "ionizing radiation curable compound"). The ionizing radiation curable functional groups are groups that crosslink and cure by irradiation of ionizing radiation, and preferable examples include functional groups having an ethylenic double bond, such as a (meth)acryloyl group, a vinyl group, and an allyl group. Note that in the present description, the (meth)acryloyl group refers to an acryloyl group or a methacryloyl group. Furthermore, in the present description, (meth)acrylate refers to acrylate or methacrylate.

Further, ionizing radiation means electromagnetic waves or charged particle beams having energy quantum that can polymerize or crosslink molecules, ultraviolet rays (UV) or electron beams (EB) are normally used, but in addition to them, ionizing radiation also includes electromagnetic waves such as X-rays and γ rays, and charged particle beams such as α rays and ion rays.

Specifically, the ionizing radiation curable compound can be properly selected from polymerizable monomers, and polymerizable oligomers that have been conventionally used as the ionizing radiation curable resins to be used.

As the polymerizable monomers, (meth)acrylate monomers having radical polymerizable unsaturated groups in molecules are preferable, and among them, polyfunctional (meth) acrylate monomer is preferable. Here, "(meth)acrylate" means "acrylate or methacrylate".

As the polyfunctional (meth)acrylate monomer, there is cited a (meth)acrylate monomer having two or more ionizing radiation curable functional groups in the molecule, and having at least a (meth)acryloyl group as the functional groups.

As the polymerizable oligomer, there is cited a (meth) acrylate oligomer having two or more ionizing radiation curable functional groups in the molecule, and having at least a (meth)acryloyl group as the functional groups, for example. For example, there are cited a urethan (meth) acrylate oligomer, epoxy (meth)acrylate oligomer, polyester (meth)acrylate oligomer, polyether (meth)acrylate oligomer, polycarbonate (meth)acrylate oligomer, acrylic (meth)acrylate oligomer and the like.

Furthermore, as the polymerizing oligomer, in addition to the above, there are a highly hydrophobic polybutadiene (meth)acrylate oligomer having a (meth)acrylate group in side chains of polybutadiene oligomer, a silicone (meth) acrylate oligomer having polysiloxane bond in a main chain, aminoplast resin (meth)acrylate-based oligomer in which an aminoplast resin having many reactive groups in the small molecule is modified, or an oligomer having a cationic polymerizable functional group in the molecules of a novolac type epoxy resin, bisphenol type epoxy resin, aliphatic vinyl ether, aromatic vinyl ether or the like, and the like.

These polymerizable oligomers may be used alone, or in combination of a plurality of types of them. From a viewpoint of improving processing characteristics and scratch resistance and weather resistance, one or more selected from the group consisting of urethane (meth)acrylate oligomer, epoxy (meth)acrylate oligomer, polyester (meth)acrylate oligomer, polyether (meth)acrylate oligomer, polycarbonate (meth)acrylate oligomer, and an acrylic (meth) acrylate oligomer is preferable, one or more selected from the group consisting of a urethane (meth)acrylate oligomer and polycarbonate (meth)acrylate oligomer is more preferable, and a urethane (meth)acrylate oligomer is even more preferable.

In the ionizing radiation curable resin composition, monofunctional (meth)acrylates can be used in combination, for the purpose of reducing viscosity of the ionizing radiation curable resin composition and the like. These monofunctional (meth)acrylates may be used alone or in combination of a plurality of types thereof.

When the ionizing radiation curable compound is an ultraviolet curable compound, the ionizing radiation curable resin composition preferably contains an additive such as a photopolymerization initiator and photopolymerization accelerator.

As the photopolymerization initiator, one or more selected from the group consisting of acetophenone, benzophenone, α-hydroxyalkylphenone, Michler's ketone, benzoin, benzyl dimethyl ketal, benzoyl benzoate, α-acyl oxime ester, thioxanthones and the like are cited.

Furthermore, the photopolymerization accelerator can reduce polymerization inhibition by air during curing and increase a curing speed, and one or more selected from the group consisting of, for example, p-dimethylaminobenzoic acid isoamyl ester, p-dimethylaminobenzoic acid ethyl ester and the like is cited.

The surface protective layer may contain additives such as an ultraviolet absorber, a light stabilizer, and a coloring agent as necessary.

A thickness of the surface protective layer is preferably 1.5 μm or more and 30 μm or less, more preferably 2 μm or more and 15 μm or less, and even more preferably 3 μm or more and 10 μm or less, from a viewpoint of balance of the processing characteristics, scratch resistance and weather resistance.

<<Transparent Resin Layer>>

The decorative sheet may have a transparent resin layer from a viewpoint of enhancing strength. When the decorative sheet has the surface protective layer, the transparent resin layer is preferably located between the base material and the surface protective layer. When the decorative sheet has a primer layer, the transparent resin layer is preferably located between the base material and the primer layer. Furthermore, when the decorative sheet has a decorative layer, from a viewpoint of protection of the decorative layer, the transparent resin layer is preferably located between the decorative layer and the surface protective layer.

As a resin constituting the transparent resin layer, there are cited a polyolefin-based resin, polyester resin, polycarbonate resin, acylonitrile-butadiene-styrene copolymer (ABS resin), acrylic resin, vinyl chloride resin and the like, and among these, a polyolefin-based resin is preferable from a viewpoint of processing suitability. Further, the transparent resin layer may be formed by mixing these illustrated resins, or may be formed by laminating layers comprising one or two or more kinds of the illustrated resins.

As the polyolefin-based resin of the transparent resin layer, there are cited polyethylene (low density, middle density, and high density), polypropylene, polymethylpentene, polybutene, ethylene-propylene copolymer, propylene-butene copolymer, ethylene-vinyl acetate copolymer, ethylene-acrylic acid copolymer, ethylene-propylene-butene copolymer and the like. Among these, polyethylene (low density, middle density and high density), polypropylene, ethylene-propylene copolymer, and propylene-butene copolymer are preferable, and polypropylene is more preferable.

The transparent resin layer may contain additives such as an ultraviolet absorber, a light stabilizer, and a coloring agent. When the transparent resin layer contains an ultraviolet absorber, the ultraviolet absorber is preferably a triazine compound, and is more preferably hydroxyphenyl triazine compound.

A thickness of the transparent resin layer is preferably 20 μm or more and 150 μm or less, more preferably 40 μm or more and 120 μm or less, and even more preferably 60 μm or more and 100 μm or less, from the viewpoint of balance of scratch resistance, processing suitability and weather resistance.

<<Primer Layer>>

When the decorative sheet has the surface protective layer, the decorative sheet preferably has a primer layer in contact with a surface on a base material side, of the surface protective layer. By the primer layer, adhesion of the base material and the surface protective layer (adhesion of the transparent resin layer and the surface protective layer when having the transparent resin layer) is improved, and securement of long-term interlayer adhesion (so-called weather resistant adhesion) when exposed to outdoor and scratch resistance can be easily made favorable.

The primer layer is mainly composed of a binder resin, and may contain additives such as an ultraviolet absorber, and a light stabilizer as necessary.

As the binder resin of the primer layer, resins such as urethane resin, acrylic polyol resin, acrylic resin, ester resin, amide resin, butyral resin, styrene resin, urethane-acrylic copolymer, polycarbonate urethane-acrylic copolymer (urethane-acrylic copolymer derived from a polymer (polycarbonate polyol) having a carbonate bond in a polymer main chain, and having two or more hydroxy groups at the ends and side chains), vinyl chloride-vinyl acetate copolymer resin, vinyl chloride-vinyl acetate-acrylic copolymer resin, chlorinated propylene resin, nitrocellulose resin (nitrified cotton), and cellulose acetate resin are preferably cited, and these resins can be used alone, or in combination of a plurality of kinds thereof. Furthermore, the binder resin may be binder resins formed by adding a curing agent such as an isocyanate-based curing agent and an epoxy curing agent to these resins, and crosslinking and curing the resins. Among them, the binder resin made by crosslinking and curing the polyol resin such as an acrylic polyol resin by the isocyanate-based curing agent is preferable, and the binder resin formed by crosslinking and curing the acrylic polyol resin by the isocyanate-based curing agent is more preferable.

A thickness of the primer layer is preferably 0.5 μm or more and 10 μm or less, more preferably 0.7 μm or more and 8 μm or less, and even more preferably 1 μm or more and 6 μm or less.

<<Other Layers>>

The decorative material of the present invention may have other layers such as an adhesive layer and a backside primer layer.

When the decorative sheet has a transparent resin layer, an adhesive layer is preferably formed between the base material and the transparent resin layer to improve adhesion of both the layers.

Note that when a decorative layer is further included between the base material and the transparent resin layer, a positional relation of the adhesive layer and the decorative layer is not particularly limited. Specifically, the decorative sheet may have the decorative layer, the adhesive layer and the transparent resin layer in this order from a side close to the base material, or may have the adhesive layer, the decorative layer and the transparent resin layer in this order from the side close to the base material.

The adhesive layer can be composed of, for example, a general-purpose adhesive such as a urethane adhesive, acrylic adhesive, epoxy adhesive, and rubber adhesive. Among these adhesives, a urethane adhesive is preferable in terms of adhesive strength.

As the urethane adhesive, there is cited an adhesive using a two-component curable urethane resin including a polyol compound such as polyether polyol, polyester polyol, and acrylic polyol, and a curing agent such as an isocyanate compound, for example.

A thickness of the adhesive layer is preferably 0.1 μm or more and 30 μm or less, more preferably 1 μm or more and 15 μm or less, and even more preferably 2 μm or more and 10 μm or less.

The backside primer layer is a layer formed on a surface on an opposite side to the first principal surface of the decorative material for the purpose of improving adhesion of the decorative material and various adherends.

The material for use in formation of the backside primer layer is not particularly limited, there are cited urethane resin, acrylic resin, polyester resin, vinyl chloride/vinyl acetate copolymer, chlorinated polypropylene resin, chlorinated polyethylene resin and the like, and the material is properly selected according to the material of the adherend.

A thickness of the backside primer layer is preferably 0.5 to 5.0 μm, and more preferably 1 to 3 μm.

The decorative layer, the surface protective layer, the primer layer, the adhesive layer and the backside primer layer described above can be formed by applying an ink containing compositions forming the respective layers by a known method such as a gravure printing method, barcode method, roll coat method, reverse roll coat method, and comma coat method, and drying and curing the ink as necessary.

Furthermore, the transparent resin layer can be formed by heat melt extrusion, for example.

<Use of Decorative Material>

The decorative material of the present invention can be used for various purposes as it is, or as a laminate in which it is bonded to an adherend, or by applying predetermined forming processing or the like to the decorative material or the laminate.

As the various use purposes, there are cited interior materials of buildings such as walls, ceilings, and floors; fittings such as window frames, doors and handrails; furniture; casings of home appliances, OA equipment and the like; exterior materials such as entrance doors and the like.

As the adherend, there are cited, for example, a wood board such as a wood veneer, wood plywood, particle board, MDF (medium density fiber board), and laminated lumber; a gypsum board such as a gypsum board, and gypsum slag board; a cement board such as a calcium silicate board, asbestos slate board, lightweight foam concrete board, and hollow extruded cement board; a fiber cement board such as a pulp cement board, asbestos cement board, and wood piece cement board; ceramic plate such as pottery, porcelain, earthenware, glass and enamel ware; a metal plate such as an iron plate, galvanized steel sheet, polyvinyl chloride sol-coated steel sheet, aluminum plate, and copper plate; a thermoplastic resin plate such as a polyolefin resin plate, acrylic resin plate, ABS resin plate, and polycarbonate plate; a thermosetting resin plate such as a phenol resin plate, urea resin plate, unsaturated polyester resin plate, polyurethane resin plate, epoxy resin plate, and melamine resin plate; a so-called FRP plate obtained by impregnating a glass fiber nonwoven fabric, textile, paper, and other various fiber base materials with a resin such as a phenol resin, urea resin, unsaturated polyester resin, polyurethane resin, epoxy resin, melamine resin, and diallyl phthalate resin, and curing them to combine them, and the like, and these may be used alone, or may be used as a composite substrate with two layers or more of them laminated.

<Forming Method of First Principal Surface>

The plurality of independent recesses (A) and the groove-shaped parallel recess and projection pattern group (B) included by the first principal surface can be formed by shaping with an embossing plate engraved with laser, for example.

Figure 6:
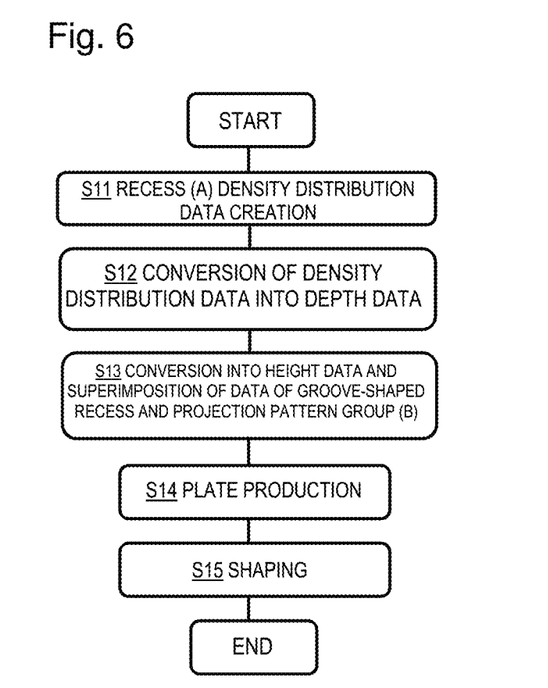
FIG. 6 is a chart showing a flow of one embodiment of steps of forming a recess and projection shape of a first principal surface of a decorative material of the present invention.

The shaping by the embossing plate engraved with laser can be carried out in steps (S11 to S15) in FIG. 6, for example. Hereinafter, the respective steps will be described.

<<S11: Creation of Density Distribution Data of Recesses (A)>>

In a density distribution data creation step (step S11), a density distribution image that is a source of a pattern of the plurality of independent recesses (A) expressed on the surface of the decorative material is acquired, and this is determined as density distribution data. As an example of the density distribution image, an image in which only a wood grain vessel pattern is expressed is cited.

The density distribution image acquired in step S11 is preferably a two-dimensional density pattern having no height information. As the density pattern like this, a photograph, a picture, a printed matter and the like are cited. Further, a three-dimensional image having height information may be used, but at this time, the height information is removed, and only information by the density in two dimensions in plan view is preferably used.

In step S11, a density value D (x, y) is obtained at each two-dimensional coordinates (x, y) to be made the density distribution data, with respect to the obtained density distribution image.

The two-dimensional coordinates (x, y) are not particularly limited, but are preferably caused to correspond to coordinates of plate (metal roll-shaped embossing plate in the present embodiment) surface described later. Further, specific expression of the density value D is not particularly limited, but the density value can be expressed in 256 gradations by setting a darkest portion of the density distribution image as 255, and a lightest portion as 0, and evenly allocating a part between them with integers, for example.

By the above, a set of data of the density value D expressed by 256 gradations in the respective coordinates (x, Y) is obtained, and this is determined as the density distribution data.

As above, the density distribution data is preferably digital data. Accordingly, when the source density distribution image is not digital data, the density distribution image is converted into digital data by using a method of reading a two-dimensional image such as a script itself, a picture of the script or the like with a scanner and AD-converting it. Further, when the pattern is designed by using digital data by using CAD or the like from the beginning, the digital data can be used.

Though means for creating the density distribution data is not particularly limited, density distribution data with a resolution of 2540 dpi with 8 bit density gradation (256 gradations) in TIF format can be created by using graphic design drawing software "photoshop" made by Adobe Systems Co., Ltd.

<<S12: Conversion of Density Distribution Data into Depth Data>>

In a conversion step into depth data (step S12), depth data is obtained by converting the density value D (x, y) of the density distribution data of the recess (A) obtained in step S11 into a depth F (x, y) at each of the coordinates (x, y). The depth data is depth data corresponding to recesses and projections of the plurality of independent recesses (A). Accordingly, by this step, shapes of the plurality of independent recesses (A) are determined.

Here, conversion of the density value D (x, y) into the depth F (x, y) is performed based on a predetermined rule. Thereby, the density distribution and the depth distribution are associated with each other, and a unique texture based on the density distribution image can be obtained in the surface pattern of the decorative material.

For example, in step S11, the darkest portion in the density distribution image is set as gradation 255, and in step S12, this is made a depth of 300 μm. On the other hand, in step S11, the lightest portion in the density distribution image is set to gradation 0, and in step S12, this is made a reference (depth of 0 μm). With respect to gradations 0 to 255 in step S11, 0 μm to 300 μm are proportionately distributed and allocated to the depth in step S12.

Consequently, according to this example, the lightest portion in the density distribution image is the reference (depth of 0 μm), the darker, the deeper, and the depth is 300 μm in the darkest portion.

<<S13: Conversion into Height Data, and Superimposition of Data of Groove-Shaped Recess and Projection Pattern Group (B)>>

In a conversion step into height data (step S13), depth data is obtained by converting the depth F (x, y) of the plurality of independent recesses (A) obtained in step S12 into a height H1 (x1, y1) for producing a plate corresponding to this. In other words, the height H1 (x1, y1) for forming a recess and projection pattern in a complimentary shape of the recesses (A) including the depth F (x, y) on the surface of the plate is created.

Here, a height H2 (x2, y2) for forming recesses and projections in a complimentary shape of the recesses and projections of the groove-shaped recess and projection pattern group (B) including predetermined depth data, on a surface of the plate is superimposed on the height H1 (x1, y1). What is obtained by superimposing the height H2 (x2, y2) onto the height H1 (x1, y1) is determined as a height H3 (x3, y3).

By forming the recesses and projections on a surface of the plate according to the height data H3 (x3, y3), the recesses and projections on the surface of the decorative material shaped by the plate conform to the height data of the first principal surface.

In the present embodiment, when the depth F (x, y) is converted to the height H (x, y), it is converted to an opposite on a same scale. In other words, when "depth" is expressed as negative, and "height" is expressed as positive, F (x, y)=−H (x, y). However, conversion is not limited to this, and the depth F (x, y) may be converted to the height H (x, y) by multiplying a predetermined coefficient α in accordance with necessity of expression. For example, conversion may be performed with F (x, y)=αH (x, y). Here, α may be either positive or negative.

According to this, a plurality of kinds of decorative materials that give different impressions can be produced from the same height data by only changing α.

<<S14: Plate Making>>

In a plate making step (S14), a plate having recesses and projections on a surface is produced by using the height data by the height H3 (x3, y3) obtained in step S13. Here, as one example, an embossing plate by a metal roll is illustrated. More specifically, the embossing plate is produced as follows.

Figure 7:
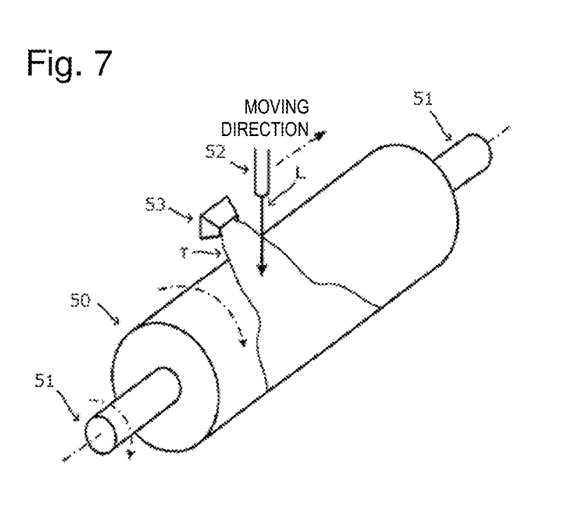
FIG. 7 is a view showing one scene of a step of producing a plate by laser, which is one example of step S14 in FIG. 6.

First, a metal roll 50 to be finally an embossing plate 50 as shown in FIG. 7 is prepared. As the metal roll 50, a metal roll with a copper layer formed by being plated on a surface of a hollow iron cylinder with rotation drive shaft (shat) 51 at both axial end portions is cited, for example. The surface of the metal roll 50 is roughened by being grounded with a grind stone or the like, and reduction in engraving efficiency due to mirror reflection of engraving laser light is preferably suppressed.

As schematically shown in FIG. 7, by using a laser light direct engraving machine, the surface of the prepared metal roll 50 is engraved based on the height data for each of the coordinates created in step S13.

The metal roll 50 drives by an electric motor via the rotation drive shaft 51, and rotates around the rotation drive shaft 51. At this time, the surface of the metal roll 50 is scanned by light L emitted from a laser head 52. As one example of the laser light L, a fiber laser light with an oscillation wavelength of 1024 nm, a spot diameter of 10 μm, and output of 360 W is cited.

When scanning the surface of the metal roll with the laser light L, On-OFF switching of the laser light (switching of irradiation and non-irradiation) is performed for each of the coordinates (x, y), according to a height of the height H3 (x3, y3) created in step S13, and in the irradiated position, the recess is formed by evaporation of the metal by laser light irradiation of one time (The recess of the plate corresponds to the projection of the decorative material. Therefore, a number of irradiation times of the laser can be made smaller at the coordinates with a larger height.). In the condition of the laser illustrated in the above, the recess with a depth of 10 μm is formed by laser light irradiation of one time.

Scanning to the metal roll surface by the laser light like this is repeated about 10 times, for example. In order to prevent the evaporated metal from being powder and remaining on or adhering to the surface of the metal roll 50, laser light irradiation is preferably performed in a state in which an engraving liquid T is sprayed to the laser light irradiation region on the surface of the metal roll from an engraving liquid ejection port 53.

In this way, by finely engraving the surface of the metal roll 50 with laser, it is possible to obtain the metal roll including the shape capable of forming the surface shape of the first principal surface.

After the recesses and projections are engraved in this way, the engraving liquid is cleaned, and thereafter, residue of the metal adhering to the surface of the metal roll 20 is preferably removed by performing electrolytic polishing. The surface of the metal roll 20 is preferably plated with hard chrome plating or the like to improve durability. A thickness of the plating layer is normally about 10 μm.

By the above steps S11 to S14, the plate 50 (decorative material forming mold, the embossing plate in the present embodiment) including the shape complementary to the recess and projection shape on the first principal surface of the decorative material can be obtained.

<<S15: Shaping>>

In a shaping step (S15), a decorative material is produced by performing embossing to the decorative material before the first principal surface is formed, by using the plate (embossing plate) produced in steps S11 to S14.

Embossing can be performed by an appropriate known method, and there is no particular limitation. A temperature and pressure during embossing can be properly adjusted according to the material of the decorative material, and is substantially 140 to 180° C. and 10 to 50 kg/cm$^2$ when the base material and the transparent resin layer of the decorative material is made of polyolefin.

A typical method for embossing is, for example, as follows.

First, the embossing plate is pressed against the surface of the softened resin base material to form the recess and projection pattern on the embossing plate surface on the base material surface. The resin base material is solidified by cooling or light irradiation to fix the recess and projection pattern on the resin base material. Thereafter, the resin on which the recess and projection pattern is formed is separated from the embossing plate.

[Production Method for Decorative Material]

A production method of the decorative material of the present invention comprises steps (1) and (2) described below.

(1) A step of performing shaping to a single layer of a base material selected from a plastic film or a complex of the plastic film and paper, or a laminate including the base material with an embossing plate to obtain the decorative material of the present invention described above (2) A step of coating a surface on the first principal surface side of the decorative material obtained in (1) described above with a filling ink including a coloring agent and a binder resin, and thereafter scraping out the filling ink.

The decorative material obtained through steps (1) and (2) described above can make the design aesthetics of the decorative material better, because the coloring agent is filled in at least parts in the depth direction of the recesses (A).

In particular, by making at least one or more embodiments selected from the ranges of $X_A$, the ranges of $X_B$, the ranges of $X_A$-$X_B$, the ranges of $Y_A$, the ranges of $Y_{B1}$, the ranges of $Y_{B2}$, and $D_A$ relationship with $D_B$, concerning the first principal surface of the decorative material obtained in step (1) are made the aforementioned preferable embodiment, thereby the filling amount of the coloring agent in the decorative material obtained in step (2) satisfies either condition of (i) and (ii) described above, and a brightness contrast between the recesses (A) and the recesses constituting the groove-shaped parallel recess and projection pattern group (B) is more enhanced, and the decorative material in which the three-dimensional effect stands out more can be obtained.

The embossing conditions in step (1) are not particularly limited, and for example, the conditions described in step S15 described above are cited.

Furthermore, step (2) preferably includes steps (2-1) to (2-3) described below.

(2-1) A step of causing the decorative material obtained in step (1) to along at least a part of the surface of the roll having a circular section so that the first principal surface side of the decorative material faces an opposite side to the roll.

(2-2) A step of coating the surface on the first principal surface side of the decorative material obtained in step (1) with the filling ink containing a coloring agent and a binder resin.

(2-3) A step of pressing a blade against the first principal surface side of the decorative material and scraping out the filling ink adhering to the first principal surface side.

In step (2-1), as a material of the roll, metal, rubber, resin and the like are cited, and among them, rubber and resin are preferable, and rubber is more preferable. By adopting a material having cushioning properties such as rubber and resin as the material of the roll, it becomes easy to prevent the coloring agent from excessively remaining in the recesses. Furthermore, by adopting a material having cushioning properties such as rubber and resin as the material of the roll, it is possible to easily satisfy either condition of (i) and (ii) described above.

The filling ink in step (2-2) contains a coloring agent and a binder resin, and preferably contains a solvent as necessary. Note that there is a tendency that the higher the viscosity of the filling ink, the harder it is for the ink in the recess to be scraped out, whereas the lower the viscosity of the filling ink, the easier it is for the ink in the recess to be scraped out. Consequently, the viscosity of the filling ink is preferably adjusted properly according to a desired filling amount.

Note that the coloring agent of the filling ink is preferably a dark color coloring agent.

As means for scraping out the filling ink in step (2-3), a scraping blade such as a doctor blade is preferably used. At this time, a direction of scraping out the ink preferably substantially corresponds to $D_A$ (within ±10 degrees to $D_A$, preferably within ±5 degrees, more preferably within ±3 degrees).

An angle of the blade with respect to the first principal surface of the decorative material is preferably substantially perpendicular. Substantially perpendicular means a range of 90±10 degrees, preferably 90±5 degrees, and more preferably 90±3 degrees. Note that a case of being inclined to a flow direction side of the decorative material is described as plus, and a case of being inclined to an opposite direction to the flow direction of the decorative material is described as minus.

Further, as a material of the blade, metal, rubber, resin and the like are cited, and among them, metal is preferable.

In step (2-3), pressure to apply the blade to the decorative material can be properly adjusted within a range in which ink streaks and unevenness do not occur.

EXAMPLES

Next, the present invention will be described in more detail based on examples, but the present invention is not limited by the examples in any way. Note that "part" is based on mass unless otherwise specified.

1. Evaluation 1-1. Three-Dimensional Effect

Arbitrary twenty adults were asked to visually evaluate whether or not they felt a three-dimensional effect under fluorescent lighting, with respect to the decorative material obtained in examples and comparative examples.

AA: Eighteen people or more answered that the three-dimensional effect was good.
A: Fifteen to seventeen people answered that the three-dimensional effect was good.
B: Eleven to fourteen people answered that the three-dimensional effect was good.
C: Ten people or less answered that the three-dimensional effect was good.

1-2. Natural Texture

Arbitrary twenty adults were asked to visually evaluate presence and absence of natural texture under fluorescent lighting, with respect to the decorative material obtained in examples and comparative examples.

AA: Eighteen people or more answered that there was a natural texture.
A: Fifteen to seventeen people answered that there was a natural texture.
B: Eleven to fourteen people answered that there was a natural texture.
C: Ten people or less answered that there was a natural texture.

2. Production of Embossing Plate

An embossing plate A with hard chrome-plating applied to the surface was produced in conformity with steps S11 to S14 of the description text. Furthermore, embossing plates B to C were produced similarly to the plate A except that the shapes of the recesses (A) and the groove-shaped parallel recess and projection pattern group (B) were changed as in Table 1. Furthermore, embossing plates D and E were produced similarly to the plate A except that the shape of the recesses (A) was changed as in Table 1 without forming the groove-shaped parallel recess and projection pattern group (B).

3. Production of Decorative Material

Example 1

On a colored base material (white polypropylene film having a thickness of 60 μm), a pattern layer of a vessel groove pattern with a black ink, and a pattern layer comprising a wood surface pattern other than a vessel part, with a brownish-red ink were formed, and a decorative layer of a wood pattern with a total thickness of 1 μm was formed.

Next, on the adhesive layer, a transparent resin layer (transparent polypropylene resin sheet, thickness: 80 μm) was laminated by an extruded laminating method.

Next, the transparent resin layer was heated and brought into a softened state, embossing treatment was applied from a surface on a transparent resin layer side by using the embossing plate A produced in the above described "2", and a recess and projection shape was formed on the surface on the transparent resin layer side (surface on the first principal surface side). The measurement value of the recess and projection shape is shown in Table 1.

Furthermore, after the surface on the transparent resin layer side (surface on the first principal surface side) was coated with a black-brown filling ink, the doctor blade was pressed against the first principal surface to be perpendicular to the first principal surface, the filling ink was scraped out, and the decorative material of example 1 was obtained. A direction of scraping out the filling ink was a same direction as $D_A$.

Examples 2 and 3

The decorative materials of examples 2 and 3 were obtained in the same way as in example 1 except that the embossing plate A was changed to the embossing plates B and C.

Comparative Examples 1 and 2

The decorative materials of comparative examples 1 and 2 were obtained in the same way as in example 1 except that the embossing plate A was changed to the embossing plates D and E.

20a, 20b, 20c, 20d, 20e, 20f, 20g, 20h, 20i, 20j, 20k, 20l: Groove-shaped recess and projection pattern
30: Coloring agent
100: Decorative material
50: Plate (embossing plate, metal roll)
51: Rotation drive shaft
52: Laser head
53: Engraving liquid ejection port

The invention claimed is:

1. A decorative material comprising, on a first principal surface side of the decorative material, a plurality of independent recesses (A), and a groove-shaped parallel recess and projection pattern group (B) that is arranged in at least a part of a spot where the plurality of independent recesses (A) do not exist, wherein when an average depth of the plurality of independent recesses (A) is defined as $X_A$, and an average depth of recesses of the groove-shaped parallel recess and projection pattern group (B) is defined as $X_B$, a relationship of $X_B < X_A$ is satisfied,
   wherein a shape in plan view of each of groove-shaped parallel recess and projection patterns constituting the groove-shaped parallel recess and projection pattern group (B) is a wave shape, and
   wherein a length of each of the groove-shaped recess and projection patterns constituting the groove-shaped parallel recess and projection pattern group (B) is a length across the decorative sheet from any end portion of the decorative sheet to another end portion.

2. The decorative material according to claim 1, wherein the $X_A$ is 40 to 150 μm, and the $X_B$ is 5 to 100 μm.

3. The decorative material according to claim 1, wherein the $X_A - X_B$ is 20 μm or more.

TABLE 1

|  |  | Example 1 | Example 2 | Example 3 | Comparative Example 1 | Comparative Example 2 |
|---|---|---|---|---|---|---|
| Embossing plate | | A | B | C | D | E |
| Recess (A) | $X_A$ (μm) | 70 | 100 | 60 | 60 | 40 |
|  | $Y_A$ (μm) | 300 | 320 | 300 | 300 | 200 |
|  | $L_A$ (mm) | 12.5 | 18 | 25 | 25 | 12.5 |
| Groove-shaped parallel recess and projection pattern group (B) | $X_B$ (μm) | 20 | 30 | 20 | — | — |
|  | $Y_{B1}$ (μm) | 80 | 80 | 80 |  |  |
|  | $Y_{B2}$ (μm) | 100 | 80 | 100 |  |  |
| Area ratio (%) of recesses (A) in first principal surface | | 30 | 35 | 30 | — | — |
| Angle (degree) formed by $D_A$ and $D_B$ | | 15 | 30 | 15 | — | — |
| $W_B < W_A$ | | Satisfy | Satisfy | Satisfy | — | — |
| Evaluation | Three-dimensional effect | AA | AA | AA | B | C |
|  | Natural texture | AA | AA | AA | C | C |

As shown in Table 1, it can be confirmed that the decorative materials of the examples can give an excellent three-dimensional effect, are excellent in expressivity of natural objects, and therefore have extremely good design aesthetics.

REFERENCE SIGNS LIST

10: Recess (A)
20: Groove-shaped recess and projection pattern group (B)

4. The decorative material according to claim 1, wherein when an average width of the plurality of independent recesses (A) is defined as $Y_A$, an average width of the recesses of the groove-shaped parallel recess and projection pattern group (B) is defined as $Y_{B1}$, and an average width of projections of the groove-shaped parallel recess and projection pattern group (B) is defined as $Y_{B2}$, $Y_A$ is 150 to 500 μm, the $Y_{B1}$ is 10 to 200 μm, and the $Y_{B2}$ is 10 to 250 μm.

5. The decorative material according to claim 1, wherein when an extending direction of the plurality of independent recesses (A) is defined as $D_A$, and an extending direction of the groove-shaped parallel recess and projection pattern group (B) is defined as $D_B$, $D_A$ and $D_B$ are non-parallel.

6. The decorative material according to claim 5, wherein an angle formed by the $D_A$ and $D_B$ is 5 to 70 degrees.

7. The decorative material according to claim 1, wherein when a shape in plan view of the recess (A) is one kind or more selected from the group consisting of a wood vessel, late wood, and a knot.

8. The decorative material according to claim 1, wherein a coloring agent is filled in at least parts in a depth direction of the plurality of independent recesses (A).

9. The decorative material according to claim 8 satisfying either condition of (i) and (ii) as follows:
   (i) the coloring agent is not filled in at least part in a depth direction of recesses of the groove-shaped parallel recess and projection pattern group (B);
   (ii) the coloring agent is filled in at least part in the depth direction of the recesses of the groove-shaped parallel recess and projection pattern group (B), and when a filling amount per unit area, of the coloring agent, is defined as $W_B$, and a filling amount per unit area of the coloring agent filled in at least parts in the depth direction of the plurality of independent recesses (A) is defined as $W_A$, a relation of $W_B < W_A$ is satisfied.

10. A method for producing a decorative material comprising steps (1) and (2) as follows:
   (1) a step of performing shaping onto a single layer of a base material selected from a plastic film or a complex of a plastic film and paper, or a laminate including the base material, with an embossing plate, to obtain the decorative material according to claim 1;
   (2) a step of coating a surface on a first principal surface side of the decorative material obtained in the (1) with a filling ink including a coloring agent and a binder resin, and thereafter scraping out the filling ink.

* * * * *